United States Patent
Lee (10) Patent No.: US 8,492,025 B2
(45) Date of Patent: Jul. 23, 2013

(54) POUCH FOR BATTERY AND POUCH TYPE SECONDARY BATTERY

(75) Inventor: Youngwoo Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1187 days.

(21) Appl. No.: 12/232,245

(22) Filed: Sep. 12, 2008

(65) Prior Publication Data
US 2009/0075168 A1 Mar. 19, 2009

(30) Foreign Application Priority Data

Sep. 14, 2007 (KR) .................. 10-2007-0093701

(51) Int. Cl.
*H01M 2/02* (2006.01)

(52) U.S. Cl.
USPC .......................................... 429/176; 429/163

(58) Field of Classification Search
USPC .......................................................... 429/176
See application file for complete search history.

(56) References Cited

U.S. PATENT DOCUMENTS

| | | | |
|---|---|---|---|
| 2003/0049527 A1* | 3/2003 | Yageta et al. | 429/179 |
| 2006/0093896 A1* | 5/2006 | Hong et al. | 429/61 |

FOREIGN PATENT DOCUMENTS

| | | | |
|---|---|---|---|
| CN | 1767228 A | | 5/2006 |
| JP | 2004-103360 | * | 4/2004 |
| JP | 2004-103360 A | | 4/2004 |
| JP | 2005-129267 A | | 5/2005 |
| JP | 2005-174680 A | | 6/2005 |
| KR | 10-2005-0020357 | | 3/2005 |
| KR | 1020060027618 A | | 3/2006 |
| KR | 1020060092421 A | | 8/2006 |

OTHER PUBLICATIONS

AIPN machine translation of JP2004-103360.*
Machine translation from KIPO of KR 10-20050020357.*

* cited by examiner

*Primary Examiner* — Maria J Laios
(74) *Attorney, Agent, or Firm* — Robert E. Bushnell, Esq

(57) ABSTRACT

A pouch for battery and a pouch type secondary battery, and more particularly, to a pouch for a battery having a space for containing an electrode assembly, the space being previously formed in a vessel form, and a pouch type secondary battery using the same. The pouch of the battery includes a vessel type bottom having a bottom surface and lateral surfaces; and a cover type top for covering an upper opening of the vessel type bottom, wherein a chamfer or step structure is formed at some of the adjoining portions of the bottom surface and the lateral surface, and the chamfer or step structure is viewed in cross section cut off along a plane which is perpendicularly to the bottom surface and approximately parallel to one surface of lateral surfaces. And the electrode assembly is contained by the pouch of battery to constitute a pouch type secondary battery according to the present invention.

5 Claims, 6 Drawing Sheets

POUCH FOR BATTERY AND POUCH TYPE SECONDARY BATTERY

CLAIM OF PRIORITY

This application makes reference to, incorporates the same herein, and claims all benefits accruing under 35 U.S.C. §119 from an application earlier filed in the Korean Intellectual Property Office on Sep. 14, 2007 and there duly assigned Serial No. 10-2007-0093701.

BACKGROUND OF THE INVENTION

1. Field of the Invention

The present invention relates to a pouch of a battery and a pouch type secondary battery having the pouch, and more particularly, to a pouch of a battery having a space for containing an electrode assembly, the space being formed in a vessel form, and a pouch type secondary battery using the same.

2. Description of the Related Art

In general, secondary batteries are rechargeable batteries, and the secondary batteries include nickel-cadmium batteries, nickel-hydrogen batteries, lithium batteries and the like. Among the secondary batteries, lithium batteries have an operating voltage of 3.6 V, which is three times higher than nickel-cadmium batteries used as power sources of the electronic devices. Also, the lithium batteries have other excellent characteristics, for example, high energy density per unit weight.

Lithium batteries may include a liquid electrolyte battery and a polymer electrolyte battery, depending on the types of electrolytes of the batteries. In general, batteries using liquid electrolyte are referred to as lithium secondary batteries, and batteries using polymer electrolyte are referred to as lithium polymer batteries. In addition, the lithium secondary battery may be manufactured in various shapes. For example, the cases of the lithium liquid secondary batteries are generally made as cylindrical shape and angular shape, the cases of the lithium polymer batteries and the like are generally made in pouch shape. In other words, Lithium liquid secondary battery has three shapes, (angular, cylindrical and pouch shapes) according to the type of its case.

As briefly described herein, the pouch type lithium battery includes a pouch as a case, and an electrode assembly is contained by the pouch.

The electrode assembly includes: a cathode plate in which a surface of an electrode collector is coated by a cathode active material; an anode plate in which a surface of an electrode assembly is coated by an anode active material; and a separator disposed between the cathode plate and the anode plate to prevent a short circuit generated by the contact of the anode plate with the cathode plate. The separator is generally formed of polymers, the separator is formed of polymers and prevents a short circuit due to the physical contact of the anode plate and the cathode plate, and the separator simultaneously enables movement of lithium ions through a transferable medium for the lithium ions between the cathode active material and the anode active material, the cathode active material and the anode active material are respectively deposited on the cathode plate and the anode plate.

The pouch may be formed to contain an electrode assembly between an upper pouch membrane and a lower pouch membrane, and to seal the peripheries of the upper pouch membrane and the lower pouch membrane. Electrode taps are exposed outwardly through sealing portions, and the electrode taps are electrically coupled to the respective electrode plates of the electrode assembly to electrically couple the electrode assembly to external electrodes.

In the pouch as configured above, the upper pouch membrane may be referred to as a top of the pouch, and the lower pouch membrane referred to as a bottom of the pouch. The bottom of the pouch may be manufactured in a vessel form to hold an electrode assembly. Here, the bottom of the pouch may be manufactured in a vessel form by a deep drawing process using a press and a punch.

The bottom of the pouch manufactured in a vessel form is provided with a bottom surface corresponding to the bottom of a vessel, and lateral surfaces corresponding to side wall surfaces of the vessel, and the upper portion of the vessel form is open to form an opening. The edge, which is a section where the lateral surface is in contact with the bottom surface, is formed approximately at a right angle.

The procedural steps for forming a pouch type secondary battery, however, generally include an injection of liquid electrolyte into a pouch, an initial charging/discharging, and a removal of gases generated during the initial charging/discharging while an electrode assembly being held in an inner space of the pouch. In particular, both of the injection of liquid electrolyte and the removal of gases is performed under vacuum condition. Because the electrode assembly is generally smaller than the inner space disposed in the pouch, the pouch is contracted by the external pressure. This contraction is similar to pouches used for packaging foods in vacuum, when the inner space of the pouches are vacuumed. In particular, a distance between a bottom surface of the bottom of the vessel type pouch and the top of the pouch becomes smaller, when the bottom surface and the top of the pouch are subject to the external pressures. Since the area of bottom surface is larger than the area of the lateral surfaces, total force applied on the bottom surface is larger than on the lateral surface when a same external pressure is respectively applied to the bottom surface and lateral surface.

A distance between the bottom surface and the top of the pouch, however, is sustained by mean of the lateral surfaces in connection to a peripheral region of the bottom surface of the pouch bottom, since the lateral surfaces act as a vessel type backbone of the pouch bottom. In particular, the peripheral region has high characteristics to sustain the original height, because a section elongated during a vessel type pouch is formed in the deep drawing process, is mechanically stronger and more rigid than other sections.

Meanwhile, there is no support means within the central region of the bottom surface of the bottom of the pouch, and therefore the thickness of the central region may be reduced to a thickness of the electrode assembly. As a result, the periphery of the pouch significantly extrudes compared to the central region of the bottom surface, since the thickness of the periphery coupled to the side walls is sustained by the lateral surfaces. The extruded portion forms an available space therein or a folded portion, which may increase the entire thickness of the pouch type secondary battery. And the uniformed thickness of the pouch may cause detachment of active materials of the electrode assembly received by the pouch.

SUMMARY OF THE INVENTION

It is, therefore, an object of the present invention to provide an improved pouch of a battery and an improved secondary battery in order to overcome the disadvantageous extrusion of the pouch.

It is another object of the present invention to provide a pouch of a battery and a secondary battery to prevent the active materials being detached from the electrode assembly because of the extrusion of the pouch.

Aspects of the present invention provide a pouch for a battery which is capable of preventing the thickness of a periphery of the pouch type secondary battery from increasing by the external pressure, compared to the central region of the pouch type secondary battery.

A pouch of a battery constructed as the aspects of the present invention includes: a vessel type bottom having a bottom surface and lateral surfaces; and a cover type top covering an upper opening of the vessel type bottom, a chamfer or a step shape structure formed at adjoining portions between the bottom surface and the lateral surfaces when the chamfer or the step structure is in viewed in a cross-section cut off along a plane which is perpendicular to the bottom surface and approximately parallel to one surface of lateral surfaces.

Either a chamfer or a step structure may be formed at the entire or part of the adjoining portions.

In the pouch for the battery constructed as the aspects of the present invention, the vessel type bottom may include a rectangular bottom surface; two parallel long side surfaces and two parallel short side surfaces which are all coupled to four edges of the rectangular bottom surface; and a flange portion provided surrounding the upper opening with the flange portion sealed with a periphery of the cover type top.

Here, the chamfer or the step shape may be limitedly formed at adjoining portions disposed between of the two parallel short side surfaces and the bottom surface, and, on the contrary, the chamfer or step shape may be limitedly formed at adjoining portions disposed between of the two parallel long side surfaces and the bottom surface.

A pouch type secondary battery constructed as the aspects of the present invention may include: an electrode assembly including an anode, a cathode and a separator arranged between the anode and the cathode; a pouch having a vessel type bottom having a bottom surface and lateral surfaces; and a cover type top covering an upper opening of the vessel type bottom to form a space to contain the electrode assembly between the vessel type bottom and the cover type top and having a knuckle line at a perimeter of the bottom surface.

In the pouch type secondary battery constructed as the aspects of the present invention, the bottom surface is formed in a rectangular shape, the lateral surface has two long side surfaces arranged parallel to each other and two short side surfaces arranged parallel to each other, the two long side surfaces and the two short side surfaces forming the circumference of the bottom surface, and the knuckle lines between the side surfaces may be formed parallel to the four sides to form a looped curve and be formed parallel to two sides of the bottom surface.

In the pouch bottom surface of the pouch type secondary battery constructed as the aspects of the present invention, a thickness, i.e., a distance between the bottom surface and the cover type top, may be sustained at a constant level, intermittently or continuously become smaller in the bottom surface as the knuckle line approaches the lateral surface. For example, the bottom surface may form a step height or an inclined plane as the knuckle line approaches the lateral surface.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
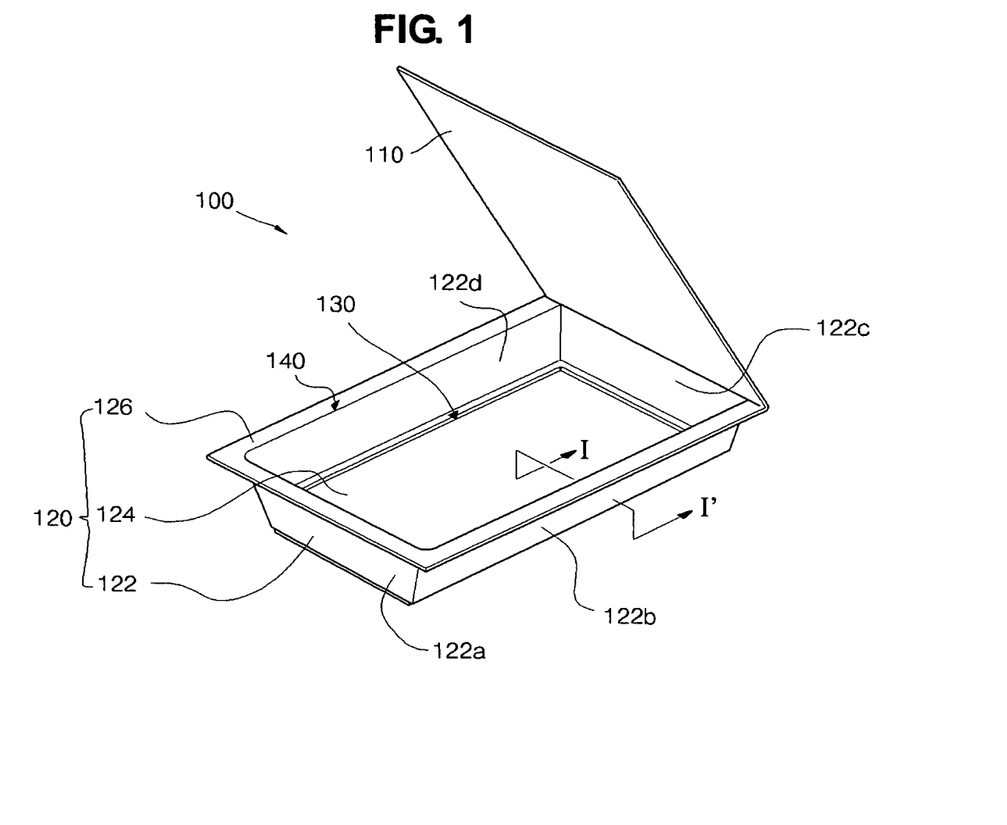
FIG. 1 is a perspective view illustrating a pouch for a battery constructed as one embodiment of the present invention.
Figure 2:
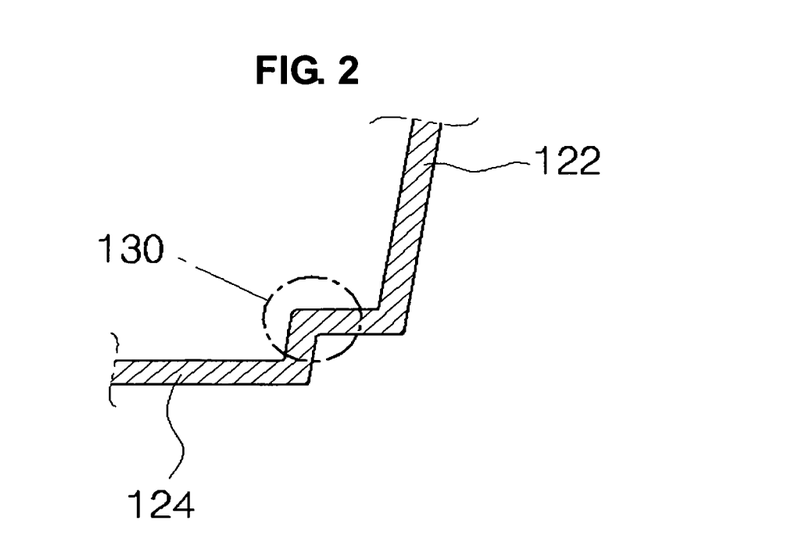
FIG. 2 is a sectional cross-sectional view of the pouch for the battery as illustrated in FIG. 1 cut out along line I-I'.

FIG. 1 is a perspective view illustrating a pouch for a battery constructed as one embodiment of the present invention; and FIG. 2 is a sectional cross-sectional view of the pouch for the battery as illustrated in FIG. 1 cut out along line I-I'.

As shown in FIGS. 1 and 2, a pouch 100 constructed according to one embodiment of the present invention includes a vessel type bottom 120 and a cover type top 110. An upper portion of vessel type bottom 120 is open to form an opening 140 through which an electrode assembly (not shown) is introduced. A flange 126 is formed surrounding opening 140, and a periphery of cover type top 110 is overlapped and heat-fused with flange 126 of vessel type bottom 120. And, when vessel type bottom 120 and cover type top 110 are fused with each other, a space within pouch 100 for containing an electrode assembly is sealed between vessel type bottom 120 and cover type top 110.

Pouch films constituting pouch 100 are generally formed in a multilayered structure having a plurality of layers. In such a multilayered structure, a three-layered structure composed of a hot junction layer, a barrier layer and a protective layer is well known. The hot junction layer has an inner layer adjoining an inner space of the pouch so that pouch films may be fused and sealed when they are brought face to face with each other, and the hot junction layer is formed of polypropylene-based resins such as cast polypropylene (CPP), and the like.

The barrier layer as an intermediate layer is composed of several micrometers of thin aluminum films. The barrier layer prevents air and moisture from the exterior of the pouch. It is difficult for a resin film such as polypropylene to function to hermetically seal the inner space since the resin film is a porous film having many micro pores in the long-term consideration. Therefore, the barrier layer is employed to function to hermetically seal its inner space. The protective layer mainly functions to sustain mechanical strength of the pouch, form an appearance and insulate the pouch from the external environments, and the protective layer is mainly composed of nylons and the like.

In this embodiment, a step 130 is formed at adjoining portions disposed between bottom surface 124 of vessel type bottom 120 and lateral surfaces 122. Lateral surfaces 122 include four surfaces, i.e. long side surfaces 122b, 122d and a pair of short side surfaces 122a, 122c. Here, bottom surface 124 is generally formed in a rectangular shape, and four sides of the rectangular bottom surface are coupled to lower ends of a pair of long side surfaces 122b, 122d and a pair of short side surfaces 122a, 122c. Long side surfaces 122b, 122d are formed parallel to each other and short side surfaces 122a, 122c are formed parallel to each other, and long side surfaces coupled to short side surfaces are coupled to each other at side ends of the lateral surfaces as shown in FIG. 1.

The periphery of bottom surface 124 of vessel type bottom 120 is a rectangular, each side of the rectangular is coupled to the end portion of one of lateral surfaces 122 by a step 130. In other words, step 130 is formed at the adjoining portions of the periphery of bottom surface 124 and lateral surfaces.

In this embodiment as shown in FIG. 1 and FIG. 2, the structure of step 130 is formed at all of the adjoining portions between bottom surface 124 and lateral surface 122 as described above. The present invention, however, is not limited thereto. Therefore, the structure of step 130 may be formed either at adjoining portions disposed between bottom surface 124 and long side surfaces 122b, 122d or at adjoining portions disposed between bottom surface 124 and short side surfaces 122a, 122c.

Figure 3:
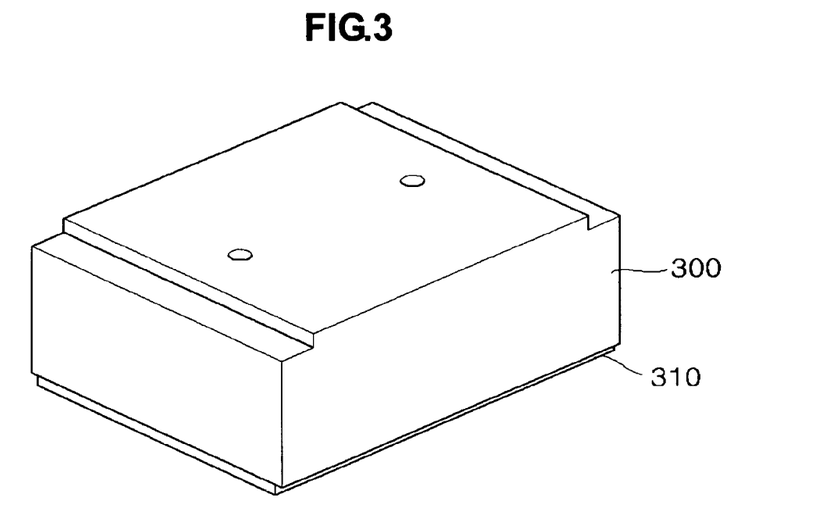
FIG. 3 is a perspective view illustrating a mold used for molding the pouch for the battery constructed as the embodiments as shown in FIG. 1 and FIG. 2.

FIG. 3 is a perspective view illustrating a mold used for molding the pouch for the battery constructed as the embodiments as shown in FIG. 1 and FIG. 2. Here, the mold construct as the embodiment of FIG. 3 is not identical to the punch according to the embodiment of FIG. 1 in aspect of the size, but it is understood that FIG. 3 is shown only in consideration of the morphological lateral surfaces for the purpose of molding the pouch as shown in FIG. 1, and therefore it is considered that the mold has the same size as the pouch molded through the mold in field of the actual applications.

As shown in FIG. 3, a mold 300 has a step 310 formed in at adjoining portion of a bottom surface and a lateral surface, a bottom surface being directed toward a base material for pouch. Therefore, if the base material for a pouch is molded by mold 300 by using a deep drawing process, the molded pouch has step 130 formed at the adjoining portions between bottom surface 124 of vessel type bottom 120 and lateral surfaces 122, as shown in FIG. 1. And, the deep drawing process of the base material for pouch through a molding equipment provided with a punch, a press, a molding die and the like is widely known in the art, and therefore their detailed descriptions are omitted in this embodiment.

Figure 4:
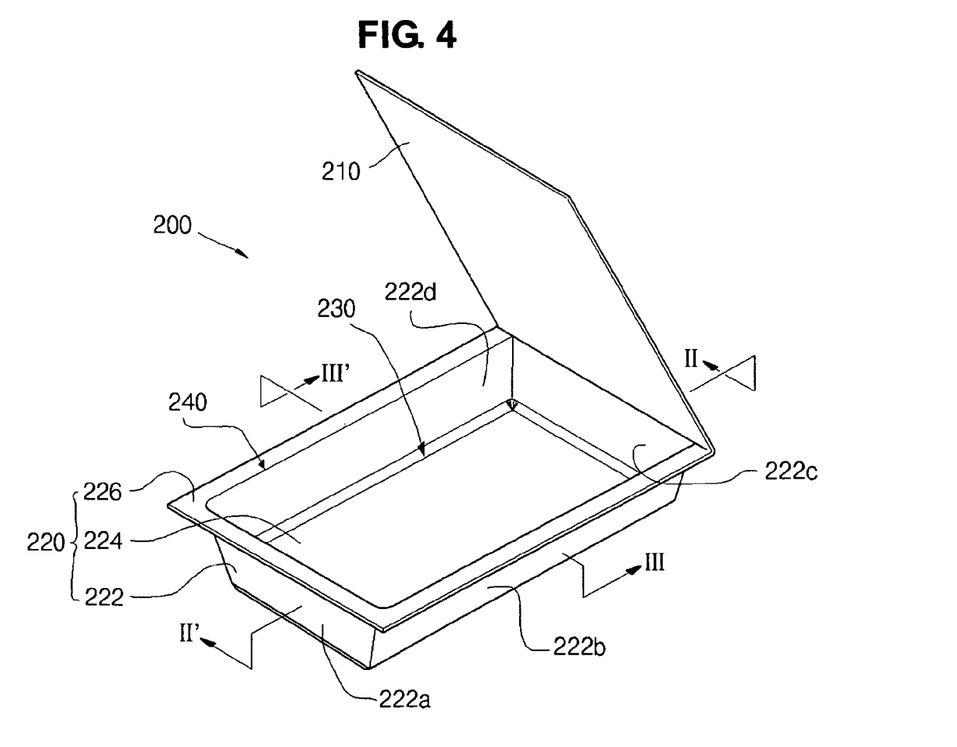
FIG. 4 is a perspective view showing a pouch for battery constructed as another embodiment of the present invention.
Figure 5:
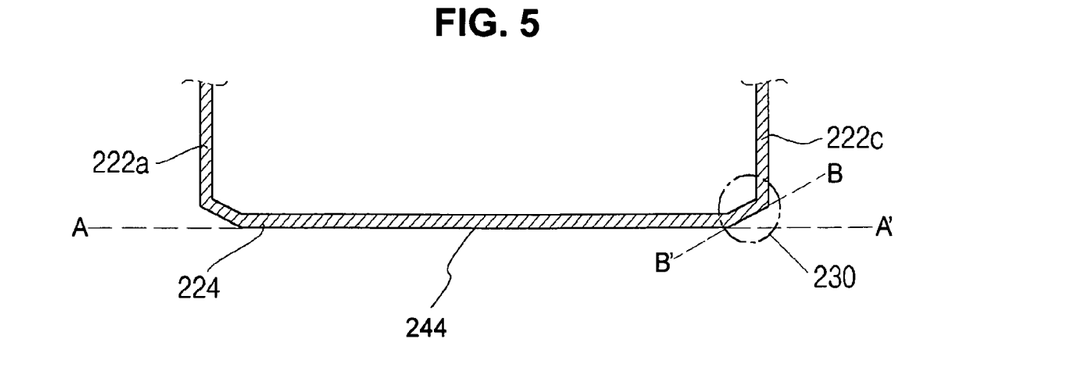
FIG. 5 is a sectional cross-sectional view of the pouch for the battery as shown in FIG. 4 cut out along line II-II'.

FIG. 4 is a perspective view showing a pouch for battery constructed according to another embodiment of the present invention; FIG. 5 is a sectional cross-sectional view of the pouch for the battery as shown in FIG. 4 cut out along line II-II'; and FIG. 6 is a sectional cross-sectional view of the pouch for the battery as shown in FIG. 4 cut out along line III-III'.

Figure 6:
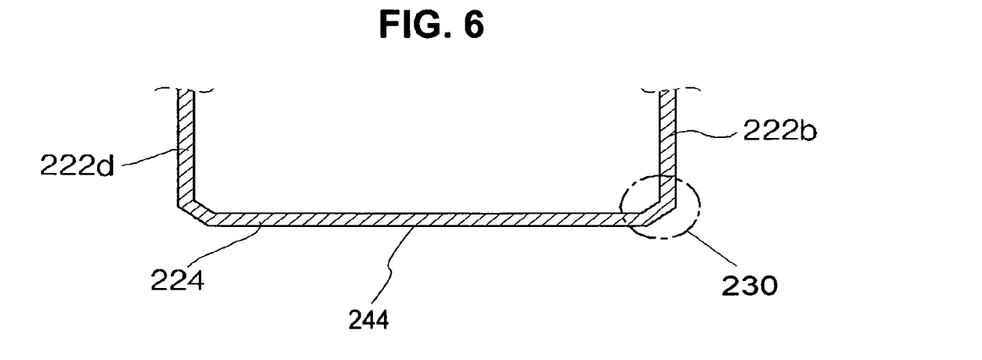
FIG. 6 is a sectional cross-sectional view of the pouch for the battery as shown in FIG. 4 cut out along line III-III'.

As shown in FIG. 4 through 6, a pouch 200 constructed as this embodiment includes a vessel type bottom 220 and a cover type top 210. Also, a flange 226 is formed surrounding an opening 240 of vessel type bottom 220, and a closed space is formed inside the pouch by heat-fusing a periphery of cover type top 210 with flange 226 of vessel type bottom 220.

Compared to pouch 100 having step 130 constructed as the previous embodiment as shown in FIG. 1, pouch 200 constructed as this embodiment has an edge formed in a shape of a chamfer 230. Geometrically, when a plane cuts into the cross-section of pouch 200 as shown in FIG. 5 and the plane is perpendicularly to the cross-section, a fall line B-B' is generated on this cross-section to couple bottom surface 224 and lateral surfaces 222. At an adjoining portion between bottom surface 224 and one surfaces of lateral surfaces 222, fall line B-B' forms an acute angle respected to an extension line A-A' assuming that bottom surface 224 is extended toward lateral surfaces 222. Fall line B-B' corresponds to a surface of chamfer 230 in edge of pouch 200.

Comparing FIG. 5 and FIG. 6, in the shape of chamfer 230 according to this embodiment, chamfer 230 at the adjoining portions between bottom 220 and short side surfaces 222a, 222c has a more gentle slope than chamfer 230 at the adjoining portions between bottom 220 and long side surface 222b, 222d.

In this embodiment, a shape of the chamfer 230 is formed in all of the edge portions of the bottom surface 224 and the lateral surface 222 of the pouch bottom 220, but the present invention is not limited thereto. Therefore, the step height structure may be formed only either in the edge portion coupled to the long side surfaces or the edge portion coupled to the short side surfaces.

Figure 7:
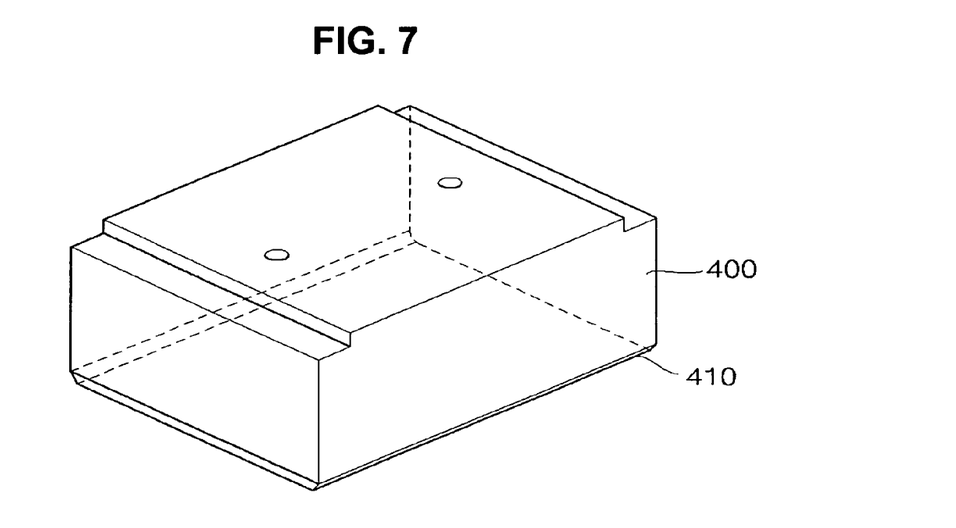
FIG. 7 is a perspective view showing a mold used for molding the pouch for the battery constructed as the embodiments as illustrated in FIG. 4 through FIG. 6.

Also, FIG. 7 shows a punch for molding a pouch constructed as the embodiment of FIG. 4. Here, mold 400 according to this embodiment is not identical to punch 200 according to the embodiment as shown in FIG. 4 in aspect of the size, it is understood that FIG. 7 is shown only in consideration of the morphological lateral surfaces for the purpose of molding the pouch as shown in FIG. 4, and therefore it is considered that the mold has the same size as the pouch molded through the mold in field of the actual applications.

As shown in FIG. 7, mold 400 has a chamfer 410 formed at the adjoining portion between a bottom surface and a lateral surface, the bottom surface being directed toward a base material for pouch. Here, a portion of chamfer 410 may be formed at all of the adjoining portions between the bottom surface and lateral surfaces, or may be formed at some portions of the adjoining portions between the bottom surface and lateral surfaces. And, if the base material for the pouch is molded by mold 400 having a portion of chamfer 410 at the edge portion of the bottom surface by using a deep drawing process, the molded pouch has a chamfered portion formed at the adjoining portions of bottom surface 224 of vessel type bottom 220 and the lateral surfaces 222, as shown in FIG. 4. And, the deep drawing process of the base material for pouch through a molding equipment provided with a punch, a press, a molding die and the like is widely known in the art, and therefore their detailed descriptions are omitted in this embodiment.

Figure 8:
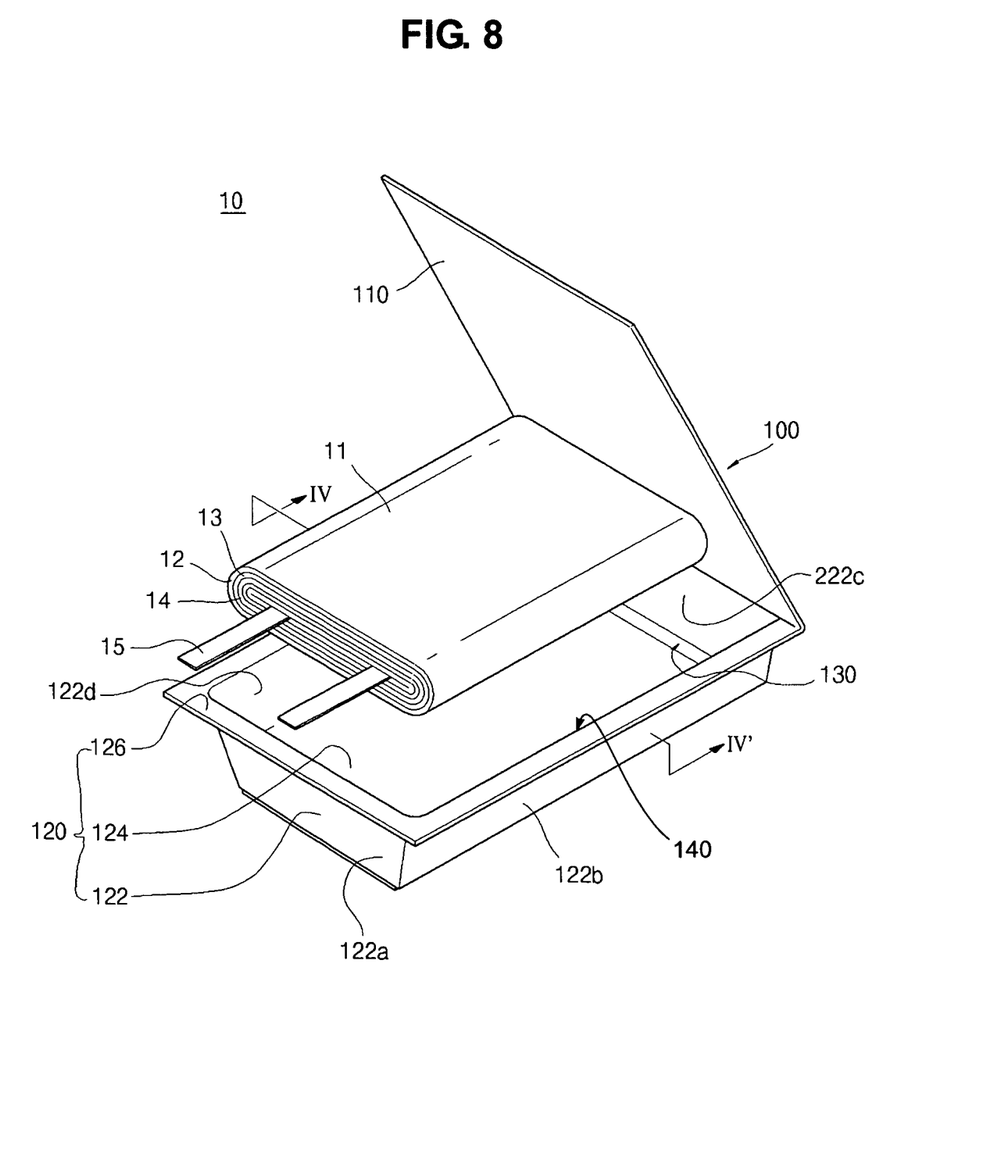
FIG. 8 is an exploded perspective view showing a pouch type secondary battery constructed according to one embodiment of the present invention.
Figure 9:
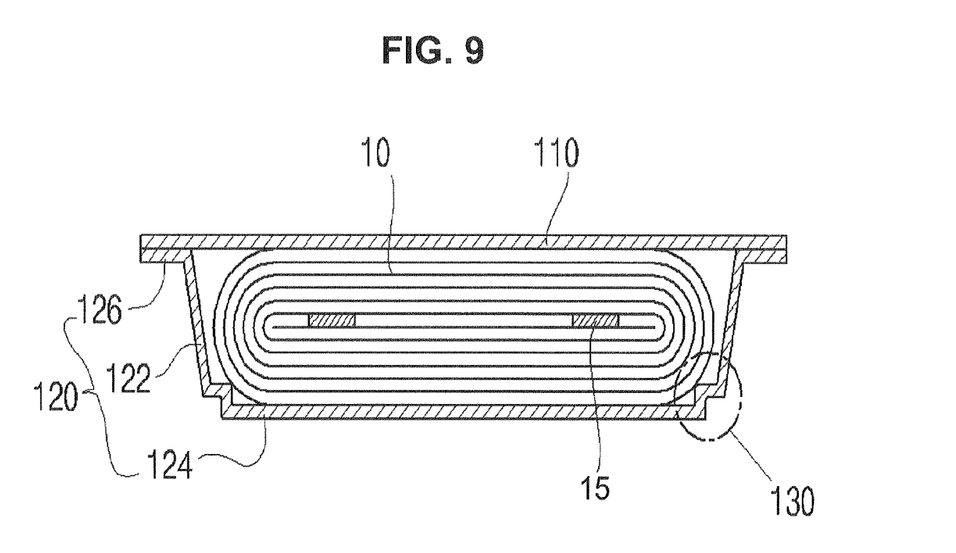
FIG. 9 is a cross-sectional view showing a pouch type secondary battery as shown in FIG. 8 cut along line IV-IV'.
Figure 10:
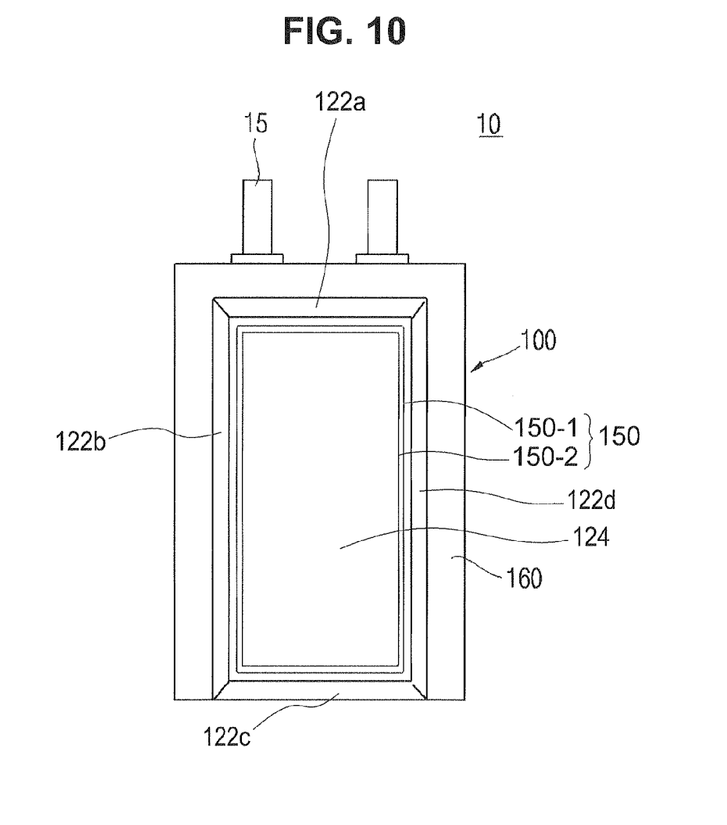
FIG. 10 shows a bottom view of the pouch type secondary battery constructed as the embodiments as shown in FIG. 8 and FIG. 9.

And, FIG. 8 through FIG. 10 show embodiments of a pouch type secondary battery using the pouch constructed as the embodiment as shown in FIG. 1. FIG. 8 is an exploded perspective view showing a pouch type secondary battery constructed as one embodiment of the present invention; FIG. 9 is a cross-sectional view showing a pouch type secondary battery as shown in FIG. 8 cut along line IV-IV'; and FIG. 10 shows a bottom view of the pouch type secondary battery constructed according to the embodiments as shown in FIG. 8 and FIG. 9.

As shown in FIG. 8, a pouch type secondary battery 10 according to this embodiment includes a pouch 100 and an electrode assembly 11.

Pouch 100 includes a vessel type bottom 120 and a cover type top 110, and a step 130 is formed at the adjoining portions between bottom surface 124 of vessel type bottom 120 and lateral surfaces 122. That is, pouch 100 of this embodiment has the same configuration of the pouch constructed according to the embodiment as shown in FIG. 1, and therefore the detailed description of the configuration of pouch 100 is omitted in this embodiment.

Electrode assembly 11 includes an anode and a cathode. Therefore, electrode assembly 11 may be modified into various shapes. As one example, this embodiment shows that such an electrode assembly is a rechargeable secondary battery. The electrode assembly, however, is not limited in the configuration as shown in FIG. 8. Referring to FIG. 8, electrode assembly 11 has a wound shape since a cathode plate 12 and a anode plate 14 are laminated while a separator 13 is interposed between cathode plate 12 and anode plate 14, separator 13 is formed of polymers and separator 13 formed of polymers prevents a short circuit caused by the physical contact between cathode plate 12 and anode plate 14, and simultaneously enables movement of lithium ions through a transferable medium of the lithium ions between the cathode active material and the anode active material, each being deposited onto cathode plate 12 and anode plate 14, respectively.

Also, cathode plate 12 and anode plate 14 are shown in a simple plate form, as shown in FIG. 8, and therefore the detailed descriptions of cathode plate 12 and anode plate 14 are omitted, but their brief descriptions are as follows. Cathode plate 12 is made by coating a surface of an electrode collector with a cathode active material, the electrode collector being composed of conventional metallic materials. Also, anode plate 14 is made by coating a surface of an electrode collector with an anode active material, the electrode collector being composed of conventional metallic materials. And, electrode taps 15 are respectively coupled to cathode plate 12 and anode plate 14, and at least one pair of electrode taps 15 are respectively electrically contacted with cathode plate 12 and anode plate 14. Here, an uncoated portion, which is not coated with active material layer, is formed in cathode plate 12 and anode plate 14, and electrode tap 15 is coupled to the uncoated portion.

And, a periphery of cover type top 110 is heat-fused with a flange 126 formed along an upper opening 140 of vessel type bottom 120 while an electrode assembly 11 is received by vessel type bottom 110 of pouch 100, as shown in FIG. 9. Reference numeral 160 represents a sealed portion between cover type top 110 and vessel type bottom 120. As a result, an inner space of vessel type bottom 120 is hermetically sealed with cover type top 110 while electrode assembly 11 is received by vessel type bottom 110. Here, a pair of electrode taps 15, which are respectively electrically coupled to cathode plate 12 and anode plate 14 of electrode assembly 11 as described above in this embodiment, have sides extended outward pouch 100, and one side of each of electrode taps 15, extended outward pouch 100 as described above, is respectively electrically coupled to an anode terminal and a cathode terminal of a conventional protective printed circuit board (not shown).

And, pouch type secondary battery 10 as configured is subject to a recharging process for use, for example repeated charging and discharging cycles, and gases generated in the charging and discharging cycles of the recharging process are pushed out of the pouch through an intake procedure. Therefore, step 130 formed at the lower portion of pouch 100 is smoothed out into a level surface or disappears during the intake procedure of the recharging process, and therefore a knuckle line 150 is formed on a bottom surface 124 of a vessel type bottom 120 in pouch 100 that forms an outer case of pouch type secondary battery 10. That is, knuckle line 150 corresponds to traces of step 130 formed in bottom surface 124 of vessel type bottom 110 of pouch 100, and knuckle line 150 is a mark which is formed in vessel type bottom 120 of pouch 100 in a looped curve shape to be formed parallel to four sides of rectangular bottom surface 124 after step 130 is smoothed out or disappears or unfolded during the intake procedure of the recharging process.

Figure 11:
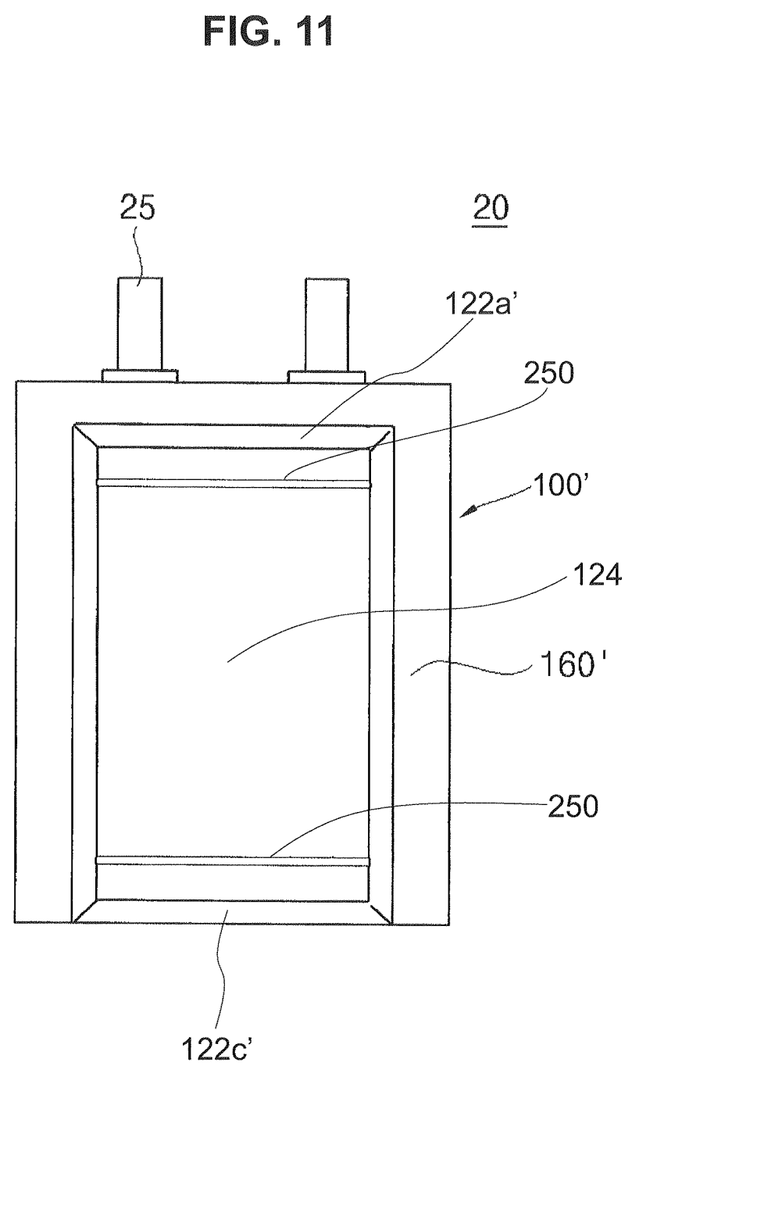
FIG. 11 shows a bottom view of a pouch type secondary battery constructed as another embodiment of the present invention.

Also, FIG. 11 shows a bottom view of a pouch type secondary battery constructed as another embodiment of the present invention, and a configuration of this embodiment will be described in detail with reference to FIG. 10.

In pouch type secondary battery 10 according to this embodiment of FIG. 10, pouch 100 has a structure where step 30 is formed at the entire adjoining portions disposed between bottom surface 124 and lateral surfaces 122, and therefore knuckle line 150 having a rectangular looped curve shape is formed on a bottom surface of pouch type secondary battery 10. In one embodiment, knuckle line 150 may include a first looped line 150-1 and a second looped line 150-2. Unlike the embodiment as shown in FIG. 10, in this embodiment as shown in FIG. 11, a pouch 100' of pouch type secondary battery 20 has a configuration that a step 130 is formed at the adjoining portions disposed between bottom surface 124 and short side surfaces 122a' and 122c', and these adjoining portions are relatively short among all the adjoining portions between the bottom surface and the lateral surfaces, and therefore a pair of parallel knuckle lines 250 is formed on the bottom surface of pouch type secondary battery 20 formed in the bottom surface of pouch 100'.

According to the configurations of the pouch for battery constructed as the embodiments and the pouch type secondary battery using the sane, a phenomenon that a periphery of the bottom surface is extruded more than the central region in the vessel type bottom of the pouch may be prevented although an intake force is applied to the inner space of the pouch that holds an electrode assembly.

Referring to FIG. 8 and FIG. 9, a thickness of a periphery of vessel type bottom 120 adjacent to lateral surfaces 122 is sustained in bottom surface 124 by means of lateral surfaces 122, since lateral surfaces 122 serves as a vessel type backbone when pouch 100 is shrunk by means of an intake force. In particular, adjoining portions disposed between bottom surface 124 and lateral surfaces 122 have stronger mechanical properties than other portions of pouch 100 since the adjoining portions disposed between bottom surface 124 and lateral surfaces 122 are elongated while vessel type pouch 100 is formed using a deep drawing process, and therefore the edges of bottom surface 124 have a high propensity to maintain the original thickness. On the contrary, since the central region has no supporting means in the bottom surface of vessel type bottom 120 of pouch 100, a thickness of the central region of the bottom surface of vessel type bottom 120 is reduced in a thickness level of electrode assembly 11 when an intake force is applied to pouch 100.

In vessel type bottom 120 of pouch 100 constructed as the embodiment of the present invention, the step structure formed at the adjoining portions disposed between bottom surface 124 and lateral surfaces 122 are provided with a structure that may compensate for a height of step 130. A phenomenon that a periphery of bottom surface 124 of vessel type bottom 120 coupled to lateral surfaces 122 is significantly outwardly extruded compared to the central region, may be either prevented or reduced, because a formation of a bended portion induced by the extrusion of the periphery of bottom surface 124 coupled to lateral surfaces 122 is effectively prevented by the step structure formed at the adjoining portions disposed between bottom surface 124 and lateral surfaces 122. Therefore, the disadvantageous increase of the entire thickness of the battery may be prevented.

Therefore, an active material layer of electrode assembly 11 may be prevented from being detached from both ends of pouch 100 in the longitudinal direction since the periphery and the central region of vessel type bottom 120 of pouch 100 have constant thicknesses, based on the shape of rectangular bottom surface 124. Here, the longitudinal direction of pouch 100 refers to a direction where electrode taps 15 are drawn abreast into electrode assembly 111 wound in a jellyroll type.

According to another lateral surface of the present invention, a method for molding a pouch for battery including a vessel type bottom and a cover type top is provided, a periphery corresponding to a circumstance of the bottom surface of the vessel type bottom is formed in a thinner thickness than a central region corresponding to a center of the bottom surface of the vessel type bottom, based on the thickness which is referred to as a gap between the vessel type bottom and the cover type top.

The periphery of the pouch may be formed at a thinner thickness level than its central region by subjecting the edge portion of the bottom surface of the vessel type bottom and the lateral surfaces to a chamfer treatment or step treatment. Here, the edge portion of the bottom surface of the vessel type bottom and the lateral surfaces may be chamfer-treated by subjecting the base material for pouch to a deep drawing process using a punch, for example a joint portion disposed between the bottom surface and the lateral surfaces is chamfered. Also, the edge portion of the bottom surface of the vessel type bottom and the lateral surfaces may be step-treated by subjecting the base material for pouch to a deep drawing process using a punch having a step structure formed at the joint portion between the bottom surface and the lateral surfaces.

As seen in the above-mentioned embodiments, the pouch for battery and the pouch type secondary battery constructed as the present invention may be useful to prevent a thickness of the periphery of the pouch type secondary battery from getting thicker than its central region, and to prevent the detachment of active materials in the electrode assembly, which is caused in the perimeter of the pouch type secondary battery when a gap between the perimeter of the pouch type secondary battery and the electrode assembly becomes wider than a gap between the central region and the electrode assembly.

Even through several embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pouch for a battery, comprising:
   a vessel having a bottom surface and lateral surfaces connected to the bottom surface, the lateral surfaces comprising a pair of shorter lateral surfaces disposed opposite to each other and a pair of longer lateral surface disposed opposite to each other;
   a cover enclosing an upper opening of the vessel; and
   first chamfers connecting the bottom surface of the vessel to the shorter lateral surfaces and second chamfers connecting the bottom surface of the vessel to the longer lateral surfaces, the first and second chamfers being formed along an entire junction disposed between the bottom surface and the lateral surfaces of the vessel, a second angle formed by one of the second chamfers and the bottom surface of the vessel being smaller in comparison with a first angle formed by one of the first chamfers and the bottom surface of the vessel.

2. The pouch for battery as claimed in claim 1, in which the bottom surface of the vessel is formed in a rectangular form, the two longer lateral surfaces are arranged parallel to each other, and a flange portion is provided surrounding the upper opening and is sealed with a periphery of the cover.

3. A pouch for a battery, comprising:
   a vessel having a bottom surface and lateral surfaces connected to the bottom surface, said lateral surfaces comprising a pair of short side surfaces and a pair of long side surfaces, said short side surfaces arranged parallel to each other and said long side surfaces arranged parallel to each other, and said short side surfaces adjoining said long side surfaces;
   an upper opening receiving an electrode assembly of the battery;
   a cover covering the upper opening of the vessel;
   a flange portion formed surrounding the upper opening, said upper opening sealed by fusing said flange portion with a periphery of said cover after the electrode assembly is received by the pouch; and
   first chamfers connecting the bottom surface of the vessel to the short side surfaces and second chamfers connecting the bottom surface of the vessel to the long side surfaces, the first and second chamfers being formed along an entire junction disposed between the bottom surface and the side surfaces of the vessel, a second angle formed by one of the second chamfers and the bottom surface of the vessel being smaller in comparison with a first angle formed by one of the first chamfers and the bottom surface of the vessel.

4. A secondary battery, comprising:
   an electrode assembly comprising an anode plate, a cathode plate and a separator arranged between the anode plate and the cathode plate;
   electrode taps electrically connecting said anode plate and said cathode plate to external electrode terminals respectively, said electrode taps extruding outward of a pouch; and
   said pouch comprising:
      a vessel having a bottom surface and lateral surfaces connected to the bottom surface, said lateral surfaces comprising a pair of short side surfaces and a pair of long side surfaces, said short side surfaces arranged parallel to each other and said long side surfaces arranged parallel to each other, and said short side surfaces adjoining said long side surfaces;
      an upper opening receiving an electrode assembly of the battery;
      a cover covering the upper opening of the vessel;
      a flange portion formed surrounding the upper opening, said upper opening sealed by fusing said flange portion with a periphery of said cover after the electrode assembly is received by the pouch; and a structure selected from a chamfer and a step formed along an entire junction disposed between the bottom surface and the lateral surfaces of the vessel, the bottom surface of the vessel and the cover in immediate physical contact with the electrode assembly.

5. A method of forming a battery, comprising:

forming an electrode assembly comprising an anode plate, a cathode plate and a separator arranged between the anode plate and the cathode plate;

forming electrode taps electrically connecting said anode plate and said cathode plate respectively to external electrode terminals, said electrode taps extruding outward of a pouch; and forming the pouch by:

molding material forming the pouch by a mold having a first bottom surface and first lateral surfaces connected to the first bottom surface, said first lateral surfaces comprising a pair of first short side surfaces and a pair of first long side surfaces, said first short side surfaces arranged parallel to each other and said first long side surfaces arranged parallel to each other, said first short side surfaces adjoining said first long side surfaces, first chamfers connecting the first bottom surface of the vessel to the first short side surfaces and second chamfers connecting the first bottom surface of the vessel to the first long side surfaces, the first and second chamfers being formed along an entire junction disposed between the first bottom surface and the first lateral surfaces, and a second angle formed by one of the second chamfers and the first bottom surface being smaller in comparison with a first angle formed by one of the first chamfers and the first bottom surface;

forming a vessel of the pouch by performing a deep drawing process to the molded material forming the pouch, with the vessel having a second bottom surface and second lateral surfaces connected to the second bottom surface, said second lateral surfaces comprising a pair of second short side surfaces and a pair of second long side surfaces, said second short side surfaces arranged parallel to each other and said second long side surfaces arranged parallel to each other, said second short side surfaces adjoining said second long side surfaces, and the vessel having an upper opening for receiving the electrode assembly;

forming a cover of the pouch for covering the upper opening of the vessel; and forming a flange portion of the pouch surrounding the upper opening of the pouch, said upper opening sealed by fusing said flange portion with a periphery of said cover after the electrode assembly is received by the pouch; and receiving the electrode assembly by the pouch.

* * * * *